(12) United States Patent
Fan et al.

(10) Patent No.: US 10,625,397 B2
(45) Date of Patent: Apr. 21, 2020

(54) GRIND MACHINING APPARATUS (71) Applicant: METAL INDUSTRIES RESEARCH & DEVELOPMENT CENTRE, Kaohsiung (TW)

(72) Inventors: Zhi-Wen Fan, Kaohsiung (TW); Jia-Jin Li, Kaohsiung (TW); Da-Yu Lin, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 134 days.

(21) Appl. No.: 15/840,216

(22) Filed: Dec. 13, 2017

(65) Prior Publication Data
US 2018/0161957 A1 Jun. 14, 2018

(30) Foreign Application Priority Data

Dec. 14, 2016 (TW) .............................. 105141489 A (51) Int. Cl.
| | |
|---|---|
| B24B 55/00 | (2006.01) |
| B23H 3/10 | (2006.01) |
| B23H 5/14 | (2006.01) |
| B23H 5/08 | (2006.01) |

(52) U.S. Cl.
CPC ............... *B24B 55/00* (2013.01); *B23H 3/10* (2013.01); *B23H 5/08* (2013.01); *B23H 5/14* (2013.01)

(58) Field of Classification Search
CPC .. B24B 55/00; B23H 3/10; B23H 5/08; B23H 5/14
USPC ................................... 451/28, 449, 451, 455
See application file for complete search history.

(56) References Cited

U.S. PATENT DOCUMENTS

| | | | | |
|---|---|---|---|---|
| 2,826,540 | A * | 3/1958 | Keeleric ................... | B23H 5/08 204/218 |
| 5,045,161 | A * | 9/1991 | McGregor ............... | B23H 3/10 204/212 |
| 2016/0031026 | A1* | 2/2016 | Taylor ..................... | B23H 5/08 205/642 |

* cited by examiner

Primary Examiner — Robert A Rose
(74) Attorney, Agent, or Firm — Rosenberg, Klein & Lee (57) ABSTRACT The present invention relates to a grind machining apparatus, which comprises a grinding wheel and an electrochemical processing module. The grinding wheel has a grinding surface on the surface. The electrochemical processing modules is disposed at the grinding wheel. The processing surface of the electrochemical processing module faces the direction away from an axle of the grinding wheel and is located lower than the grinding surface. By using the above grind machining apparatus, alternate compound machining including electrochemical oxidation processing and mechanical grind machining can be performed.

14 Claims, 5 Drawing Sheets

GRIND MACHINING APPARATUS

FIELD OF THE INVENTION

The present invention relates generally to a machining apparatus, and particularly to a grind machining apparatus.

BACKGROUND OF THE INVENTION

Among all mechanical machining processes, grind machining plays an important role. Grind machining is mainly achieved by spinning the grinding wheel to contact the surface of a workpiece. Then the grinding abrasives located on the surface of the circumference of a grinding wheel can mechanical machine the workpiece. Unfortunately, if the material of the workpiece is a metal material with high hardness, it is difficult for the grinding abrasives of the grinding wheel to perform mechanical machining on the workpiece, and grinding the workpiece can accelerate wearing of the grinding wheel, leading to increases in processing cost. Accordingly, current grind machining is still limited by the material of the workpiece.

SUMMARY

An objective of the present invention is to provide a grind machining apparatus, which can perform alternate compound machining including electrochemical oxidation processing and mechanical grind machining.

The present invention provides a grind machining apparatus, which comprises a grinding wheel and an electrochemical processing module. The grinding wheel has a grinding surface on the surface. The electrochemical processing modules is disposed at the grinding wheel. The processing surface of the electrochemical processing module faces the direction away from an axle of the grinding wheel and is located lower than the grinding surface. Thereby, by using the above grind machining apparatus, alternate compound machining including electrochemical oxidation processing and mechanical grind machining can be performed.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
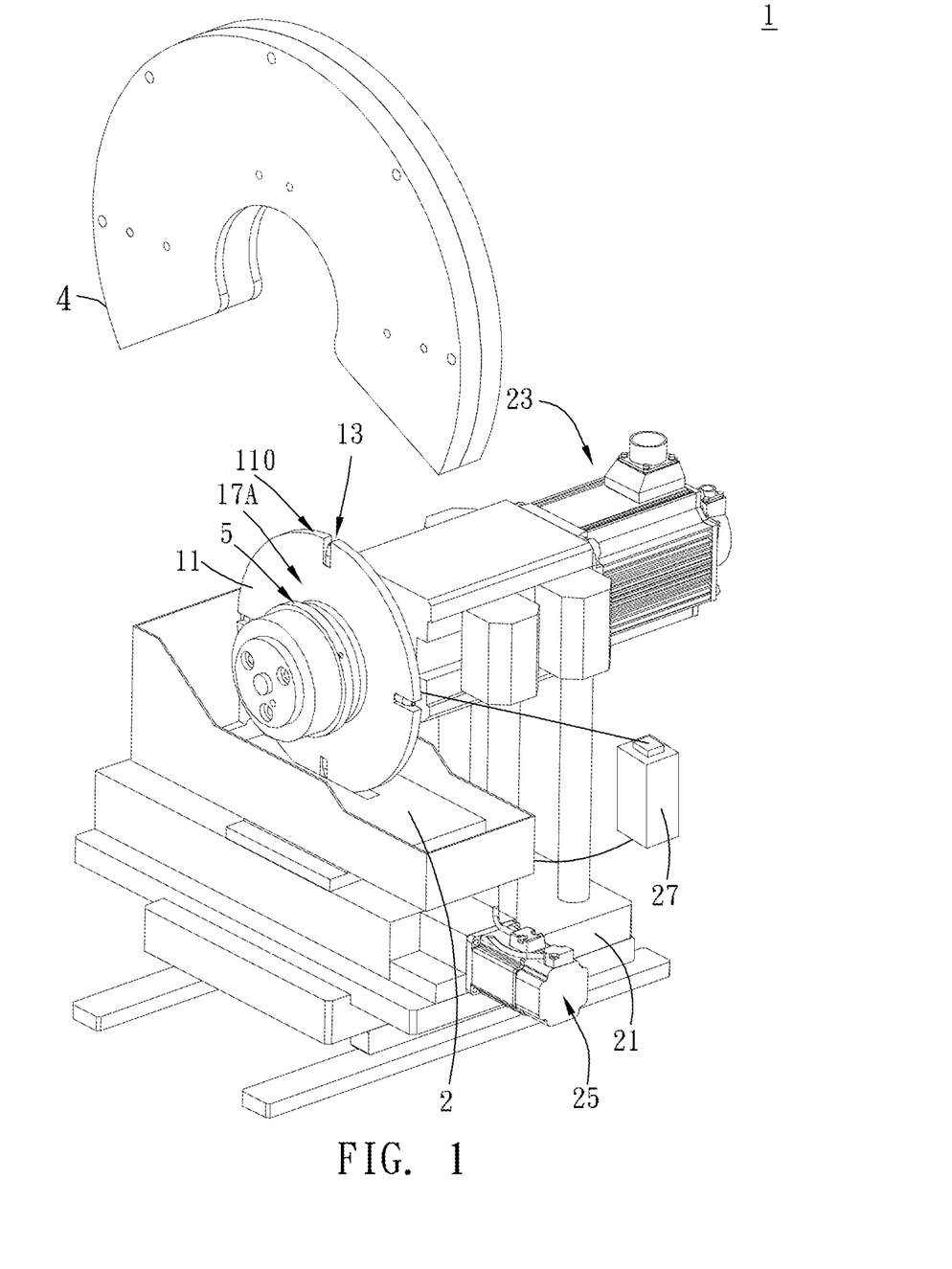
FIG. 1 shows a stereoscopic view of the grind machining apparatus according an embodiment of the present invention.
Figure 2:
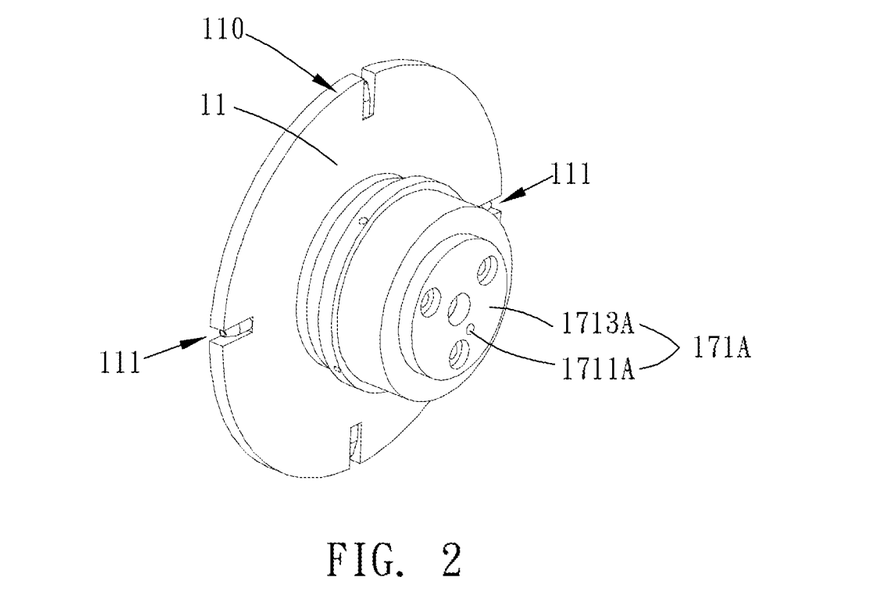
FIG. 2 shows a stereoscopic view of the compound machining mechanism of the grind machining apparatus according an embodiment of the present invention.

Please refer to FIG. 1 and FIG. 2, which show stereoscopic views of the grind machining apparatus and the compound machining mechanism thereof according an embodiment of the present invention. As shown in the figures, the grind machining apparatus 1 according to the present embodiment is used in alternate compound machining including electrochemical oxidation processing and mechanical grind machining. The grind machining apparatus 1 according to the present embodiment comprises a compound machining mechanism, which includes a grinding wheel 11 and an electrochemical processing module 13. The grinding wheel 11 is used to perform mechanical grinding or cutting machining for a workpiece. The electrochemical processing module 13 is used to perform electrochemical oxidation processing for the workpiece. The surface of the workpiece becomes a loose oxidized surface after the electrochemical oxidation processing, making it easier for the grinding wheel 11 to grind or cut the surface of the workpiece. By using the electrochemical processing module 13 and the grinding wheel 11, alternate compound machining can be performed on metal materials that are difficult to be machined. Hence, the applications of grind machining can be extended.

Figure 3:
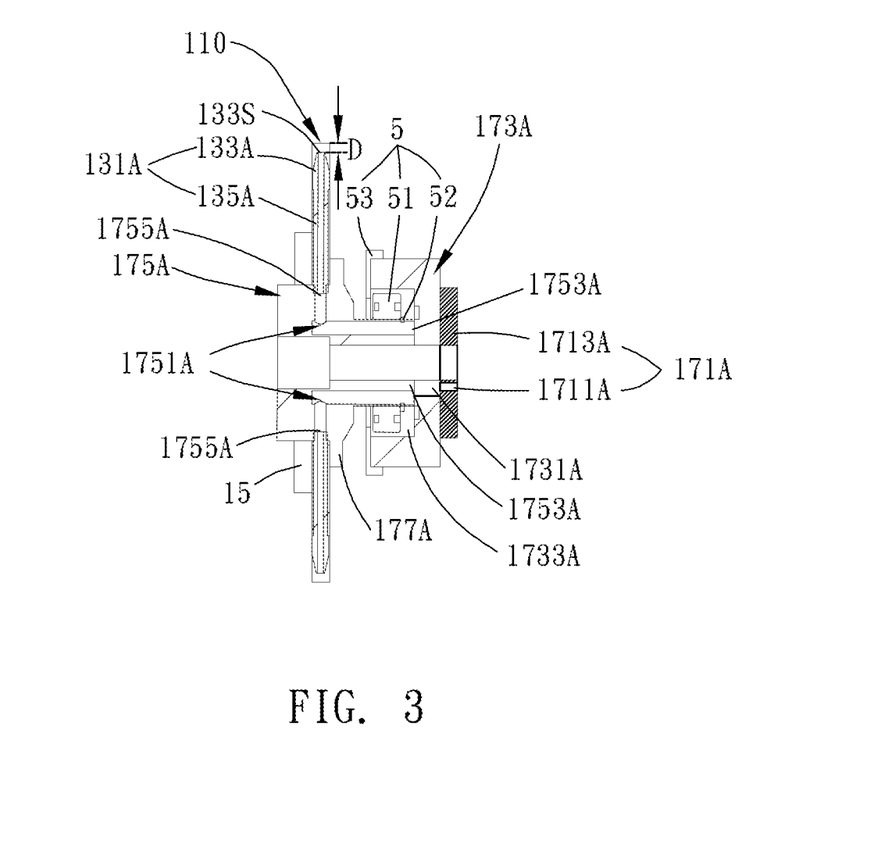
FIG. 3 shows a cross-sectional view of the compound machining mechanism of the grind machining apparatus according an embodiment of the present invention.
Figure 4:
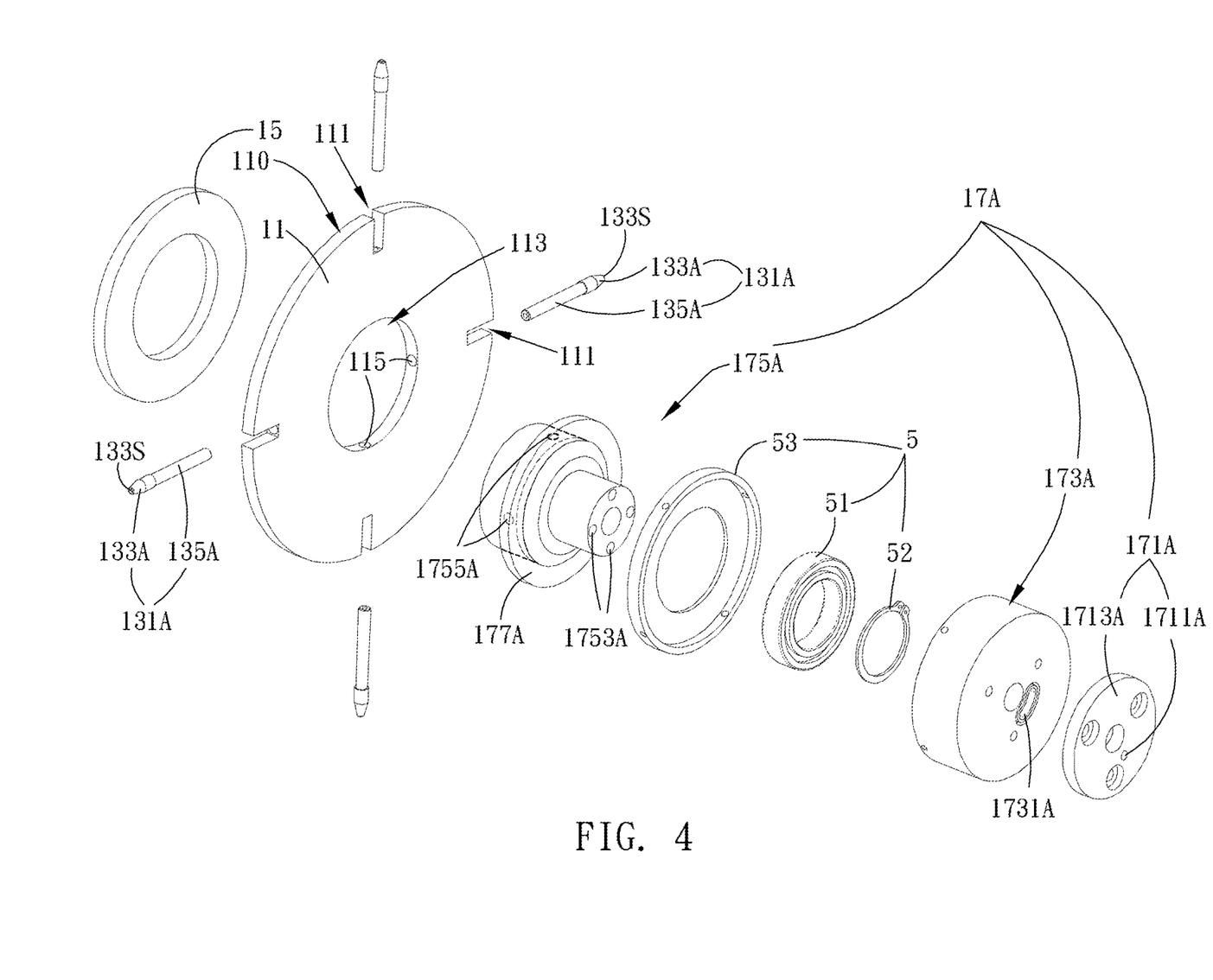
FIG. 4 shows an exploded view of the compound machining mechanism of the grind machining apparatus according an embodiment of the present invention.

Please refer to FIG. 3 and FIG. 4, which show a cross-sectional view and an exploded view of the compound machining mechanism of the grind machining apparatus according an embodiment of the present invention. As shown in the figures, the grinding wheel 11 has a grinding surface 110 on the surface. According to the present embodiment, the grinding surface 110 is, but not limited to, the surface on the circumference of the grinding wheel 11. The electrochemical processing module 13 is disposed at the grinding wheel 11. The processing surface 133 S of the electrochemical processing module 13 faces the direction away from the axle of the grinding wheel 11. Namely, the processing surface 133S faces outwards to the grinding surface 110. In addition, the processing surface 133 S of the electrochemical processing module 13 is located lower than the grinding surface 110 by a gap D. The grinding wheel 11 has a plurality of notches 111 on the surface of the circumference of the grinding wheel 11. The grinding wheel 11 further has an axle hole 113 at the center. Besides, the grinding wheel 11 has a plurality of holes 115 running from the inner sidewall of the axle hole 113 to the notches 111, respectively. Thereby, the holes 115 communicate with the notches 111, respectively.

In addition, the electrochemical processing module 13 includes a plurality of electrochemical processing units 131A. Each electrochemical processing unit 131A further includes a processing electrode 133A and a draining member 135A. The processing electrode 133A is disposed at one end of the draining member 135A. The other ends of the draining members 135A of the electrochemical processing units 131A pass through the holes 115 via the notches 111, respectively. In other words, the electrochemical processing units 131A are disposed in the notches 111, respectively. The processing surface 133S of each processing electrode 133A can be a plane and face the direction away from the axle of the grinding wheel 11. Besides, the processing surface 133A is located lower than the grinding surface 110. The electrochemical processing units 131A are conductors. According to an embodiment of the present invention, the processing electrode 133A can be an injection member for injecting electrolyte. The draining member 135A can be draining tube for transporting electrolyte to the processing electrode 133A, which communicates with the draining member 135A.

According to the present embodiment, the compound processing mechanism maybe further include an electrically conductive member 15 and an electrolyte transport module 17A. The electrically conductive member 15 is located on one side of the grinding wheel 11. The electrolyte transport module 17A passes through the axle hole 113 of the grinding wheel 11 and maybe act as the spindle of the grinding wheel 11 for driving the grinding wheel 11 to spin. The electrolyte transport module 17A further passes through the electrically conductive member 15. Thereby, the grinding wheel 11 is sandwiched between the electrically conductive member 15 and the electrolyte transport module 17A. Besides, the electrolyte transport module 17A is connected to the electrochemical processing module 13 for supplying electrolyte to the electrochemical processing module 13.

The electrolyte transport module 17A includes an input structure 171A, a flow guiding member 173A, and an electrolyte distribution structure 175A. The input structure 171A includes a lid 1713A. The lid 1713A has an input hole 1711A. The input hole 1711A is a through hole. The flow guiding member 173A has a chamber 1731A. The lid 1713A covers the flow guiding member 173A and the opening of the chamber 1731A. The input hole 1711A communicates with the chamber 1731A. The flow guiding member 173A is disposed at the electrolyte distribution structure 175A. The chamber 1731A communicates with the electrolyte distribution structure 175A. The electrolyte distribution structure 175A passes through the axle hole 113 of the axle of the grinding wheel 11. The electrolyte distribution structure 175A has a plurality of transport channels 1751A. Each transport channel 1751A has a first end opening 1753A and a second end opening 1755A, respectively. One of the first end openings 1753A communicates with the chamber 1731A when the grinding wheel 11 is spun. The second end openings 1755A correspond to the holes 115 of the grinding wheel 11, respectively, and communicate with the draining members 135A of the electrochemical processing units 131A, respectively. Furthermore, the electrolyte distribution structure 175A further has a fixing part 177A surrounding the surface of the electrolyte distribution stricture 175A. Then the grinding wheel 11 is sandwiched between the electrically conductive member 15 and the fixing part 177A of the electrolyte distribution structure 175A. Besides, the electrolyte distribution structure 175A is a conductor.

Moreover, the shape of the chamber 1731A of the flow guiding member 173A is a curved-shape, and the chamber 1731A is located on the spinning path of the first end openings 1753A of the transport channels 1751A of the electrolyte distribution structure 175A. The area of the chamber 1731A is greater than the area of the first end opening 1753A of each transport channel 1751A.

In addition, the grind machining apparatus 1 according to the present embodiment further includes a spin mechanism 5, which includes a bearing 51, a limiter 52, and an axle positioning member 53. The spin mechanism 5 is disposed between the flow guiding member 173A and the electrolyte distribution structure 175A. The bearing 51 passes through the electrolyte distribution structure 175A and is located inside an accommodating part 1733A of the flow guiding member 173A. Namely, the front section of the electrolyte distribution structure 175A and the bearing 51 are located inside the accommodating part 1733A of the flow guiding member 173A. The electrolyte distribution structure 175A can spin in the bearing 51 with respect to the flow guiding member 173A, where the flow guiding member 173A does not spin. The limiter 52 surrounds and is fixed to the front section of the electrolyte distribution structure 175A, and is located on one side of the bearing 51. The axle positioning member 53 is put around the electrolyte distribution structure 175A and fixed on one side of the flow guiding member 173A. The bearing 51 and the limiter 52 are fixed between the axle positioning member 53 and the flow guiding member 173A.

According to the present embodiment, the grind machining apparatus 1 further comprises a base 21, a driving module 23, a workpiece moving mechanism 25, and a power supply module 27. The driving module 23 is disposed on the base 21 and has a transmission shaft (not shown in the figures). The transmission shaft passes through the electrolyte distribution structure 175A. The workpiece moving mechanism 25 is located on one side of the driving module 23 and disposed on the base 21. The power supply module 27 is coupled electrically to the electrochemical processing module 13 and the workpiece 2.

The workpiece 2 is placed on the workpiece moving mechanism 25 to make the grinding wheel 11 correspond to the workpiece 2. The driving module 23 drives the electrolyte distribution structure 175A to spin, and thus driving the grinding wheel 11 to spin corresponding to the workpiece 2. The electrolyte is input to the chamber 1731A of the flow guiding member 173A via the input hole 1711A of the input structure 171A. The electrolyte then flows from the chamber 1731A to the transport channels 1751A of the electrolyte distribution structure 175A, and enters the draining members 135A of the electrochemical processing units 131A via the transport channels 1751A. The electrolyte is guided to the processing electrodes 133A by the flow guiding members 135A and injected. In addition, the power supply module 27 supplies power to the electrically conductive member 15, which is connected electrically to the electrolyte distribution structure 175A of the electrolyte transport module 17A. The electrolyte distribution structure 175A is connected electrically to the electrochemical processing units 131A. Thereby, the power supply module 27 supplies power to the electrochemical processing units 131A.

While performing grind machining, the grinding wheel 11 is driven to spin. The processing surface 133S of each electrochemical processing unit 131A of the grinding wheel 11 corresponds to the workpiece 2. Then the grinding wheel 11 can perform electrochemical oxidation processes on the surface of the workpiece 2 repeatedly and oxidize the surface of the workpiece 2, and therefore the structure of the surface of the workpiece 2 becomes a loose oxidation structure. As the grinding surface 110 of the grinding wheel 11 corresponds to the surface of the workpiece 2, the grinding surface 110 of the grinding wheel 11 presses the surface of the workpiece 2. The grinding abrasives on the grinding surface 110 of the grinding wheel 11 grinds mechanically to remove the oxidation structure on the surface of the workpiece 2. Because the electrochemical processing units 131A are disposed in the notches 111 of the grinding wheel 11, where the notches 111 act as the spacer for electrochemical oxidation processing and mechanical grinding machining, the grind machining apparatus 1 can perform alternate electrochemical oxidation processing and mechanical grind machining as well as improving processing stability. Accordingly, the grind machining apparatus 1 can perform electrochemical oxidation processes on the surface of the workpiece 2 for reducing the hardness of the workpiece 2. The stress between the grinding wheel 11 and the surface of the workpiece 2 as well as the mechanical grinding and cutting force can be lowered. Thereby, the surface processing quality can be improved and the lifetime of the grinding wheel 11 can be extended. In addition, it is possible to perform grind machining on high-hardness materials or materials difficult to process.

Besides, the electrochemical processing unit 131A can provide the electrolyte in an injection way, which can enhance flowing of the electrolyte and hence facilitating deep cutting. Moreover, the grinding surface 110 of the grinding wheel 11 is not conductive, so electrochemical oxidation processes will not occur thereon. The electrochemical processing units 131A are disposed at intervals in the grinding wheel 11. Hence, when the grinding wheel 11 spins, the electrochemical processing units 131A encounter the workpiece 2 intermittently, forming power loop therebetween intermittently. Then currents will flow through the electrochemical processing units 131A and the workpiece 2 intermittently and thus forming power pulses for performing electrochemical oxidation processes on the workpiece 2. Thereby, the power equipment may be simplified by using a simple direct-current power supply to give electrical power pulses. Furthermore, by combining the grinding wheel 11 and the electrochemical processing units 131A, the grind machining apparatus 1 can be miniaturized.

Please refer again to FIG. 1. The present embodiment further comprises a cover 4, which covers a portion of the grinding surface 110 of the grinding wheel 11, namely, a portion of the surface of the grinding wheel 11. Thereby, the electrolyte injected from the electrochemical processing units 131A not corresponding to the workpiece 2 can be blocked and collected to flow to the workpiece 2.

Figure 5A:
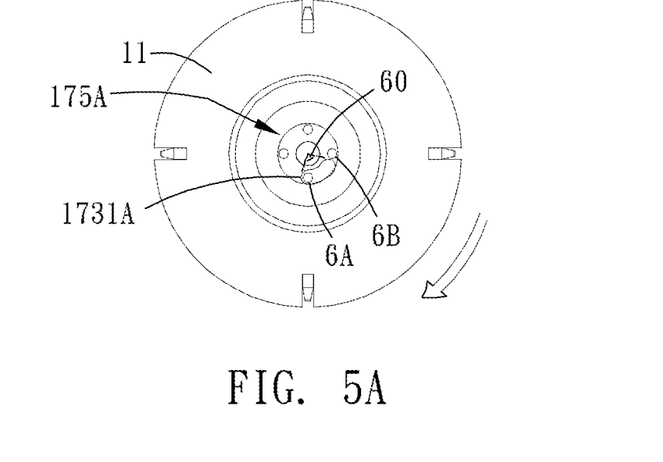
FIG. 5A shows a first schematic diagram of clockwise operation of the compound machining mechanism of the grind machining apparatus according an embodiment of the present invention.
Figure 5B:
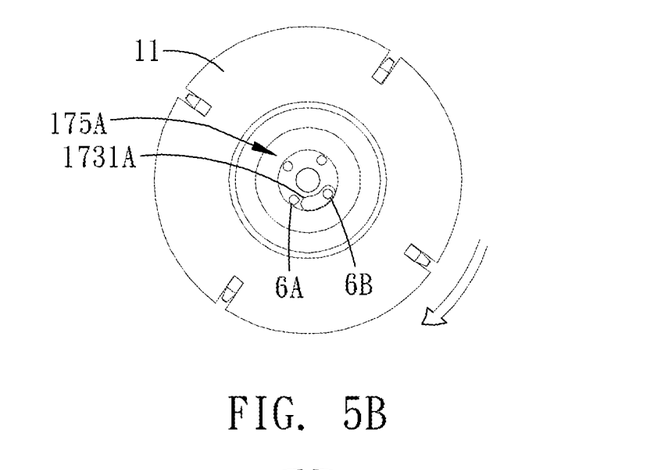
FIG. 5B shows a second schematic diagram of clockwise operation of the compound machining mechanism of the grind machining apparatus according an embodiment of the present invention.
Figure 5C:
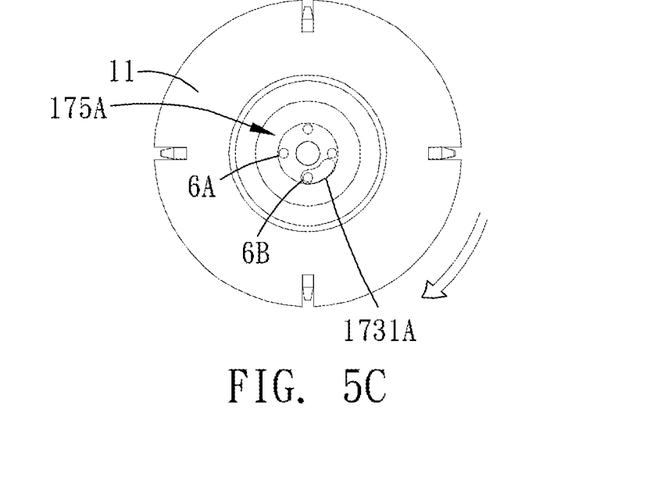
FIG. 5C shows a third schematic diagram of clockwise operation of the compound machining mechanism of the grind machining apparatus according an embodiment of the present invention.

Please refer to FIG. 5A to FIG. 5C, which show first to third schematic diagrams of clockwise operation of the compound machining mechanism of the grind machining apparatus according an embodiment of the present invention. The operation of the electrolyte transport module 17A transporting the electrolyte will be described in the following. As the grinding wheel 11 and the electrolyte distribution structure 17A spin clockwise, since the flow guiding member 173A does not spin, the location of the chamber 1731A of the flow guiding member 173A will not change. The location of the chamber 1731A of the flow guiding member 173A corresponds to the spin path of the first end openings 1753A of the transport channels 1751A in the electrolyte distribution structure 175A.

According to the present embodiment, two end openings 6A, 6B of two transport channels 1751A will be used for description. At the initial stage of grinding, the end opening 6A corresponds to the chamber 1731A, as shown in FIG. 5A. Namely, the end opening 6A communicates with the chamber 1731A. Then the electrolyte is led into the transport channel 1751A having the end opening 6A. Finally, the electrolyte is transported via the transport channel 1751A having the end opening 6A to the electrochemical processing unit 131A communicating with the transport channel 1751A and injected. As shown in FIG. 5A, the end opening 6B does not correspond to the chamber 1731A.

Next, the electrolyte distribution structure 175A continues to spin clockwise. The end opening 6A becomes not corresponding to the chamber 1731A, as shown in FIG. 5B. It means that the end opening 6A does not communicate with the chamber 1731A. The end opening 6B becomes corresponding to the chamber 1731A, as a result of spin. Hence, the end opening 6B communicates with the chamber 1731A. The electrolyte is led into the transport channel 1751A having the end opening 6B. The subsequent steps are similar to the above description, and will not be described further.

According to the present embodiment, the chamber 1731A is curved, spanning a radian angle 60, and having an area corresponding to the radian angle 60. Namely, the chamber 1731A covers a part of the spin path of the first end opening of the transport channel 1751A. As the end opening 6B of the electrolyte distribution structure 175A is moved into the corresponding zone of the radian angle 60 due to spin, as shown in FIG. 5C, the end opening 6B becomes communicating with the chamber 1731A. Then the electrolyte can be led into the transport channel 1751A having the end opening 6B continuously. According to the above description, the radian angle 60 is determined by the range spanned by the end opening of the transport channel 1751A moving along the chamber 1731A; it corresponds to the predetermined location of electrolyte injection from the electrochemical processing unit 131A, the injection range, and the injection angle. Thereby, while performing compound machining, by the design of the radian angle 60 of the chamber 1731A and based on the predetermined location for performing electrochemical oxidation processes on the workpiece 2, the electrolyte can be injected in advance, avoiding the situation in which the electrolyte can not be injected promptly.

Figure 5D:
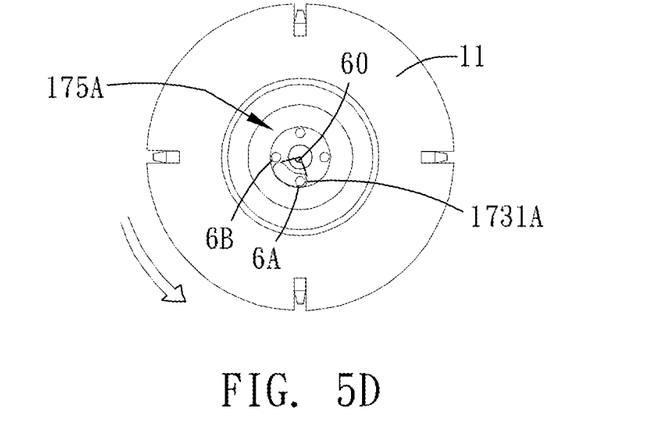
FIG. 5D shows a first schematic diagram of counterclockwise operation of the compound machining mechanism of the grind machining apparatus according an embodiment of the present invention.
Figure 5E:
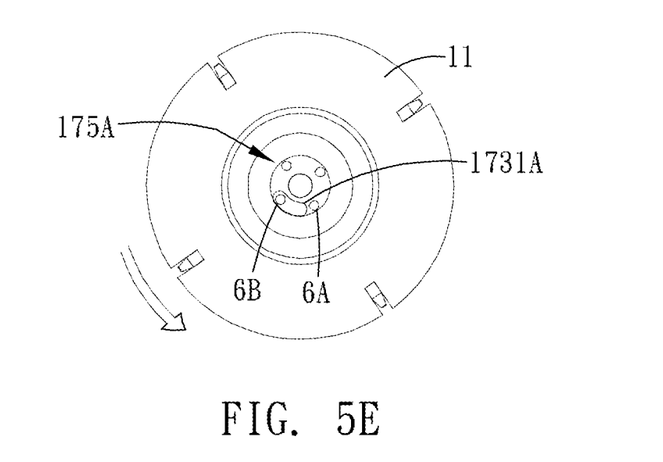
FIG. 5E shows a second schematic diagram of counterclockwise operation of the compound machining mechanism of the grind machining apparatus according an embodiment of the present invention.
Figure 5F:
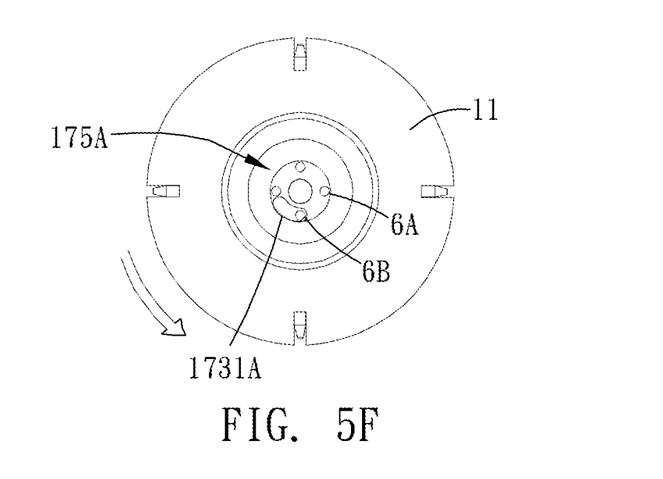
FIG. 5F shows a third schematic diagram of counterclockwise operation of the compound machining mechanism of the grind machining apparatus according an embodiment of the present invention.

Please refer to FIG. 5D to FIG. 5F, which show first to third schematic diagrams of counterclockwise operation of the compound machining mechanism of the grind machining apparatus according an embodiment of the present invention. As shown in the figures, the difference between the counterclockwise operation according to the present embodiment and the clockwise operation in the previous description is the location of the chamber 1731A with respect to the electrolyte distribution structure 175A. The difference between the counterclockwise operation according to the present embodiment and the clockwise operation in the previous description includes the operation direction and the designed location of the chamber 1731A. Hence, the operation will not be described again.

To sum up, the present invention provides a grind machining apparatus, which comprises a grinding wheel and an electrochemical processing module. The grinding wheel is used to mechanical grinding a workpiece. The electrochemical processing module is used to perform electrochemical oxidation process on the workpiece. The grinding wheel and the electrochemical processing module can be used to perform alternate compound processes including electrochemical oxidation and mechanical grinding. Thereby, the stress between the grinding wheel and the surface of the workpiece can be reduced, the surface processing quality can be improved, and the processing stability can be enhanced. In addition, the grinding surface of the grinding wheel is not conductive while the electrochemical processing module is. BY using the two alternately, power can flow through the workpiece intermittently, which is equivalent to performing electrochemical oxidation processes using electrical power pulses. Then, by using a simple direct-current power supply, pulsed electrochemical oxidation processes can be achieved on the workpiece, simplifying the power equipment. Besides, thanks to compound the grinding wheel and the electrochemical processing module, the grind machining apparatus can be miniaturized.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A grind machining apparatus, comprising:
a grinding wheel, having a grinding surface;
an electrochemical processing module, disposed at said grinding wheel, and having a processing surface facing the direction away from an axle of said grinding wheel and located lower than said grinding surface;
an electrically conductive member; and
an electrolyte transport module; wherein said electrolyte transport module passes through said axle of said grinding wheel and said electrically conductive member; said grinding wheel is sandwiched between said electrically conductive member and said electrolyte transport module; and said electrolyte transport module is connected with said electrochemical processing module.

2. The grind machining apparatus as claimed in claim 1, wherein said electrolyte transport module includes a flow guiding member and an electrolyte distribution structure; said flow guiding member having a chamber; said flow guiding member disposed at said electrolyte distribution structure; said chamber communicating with said electrolyte distribution structure; and said electrolyte distribution structure disposed in said grinding wheel and communicating with said draining members of said electrochemical processing units.

3. The grind machining apparatus as claimed in claim 2, wherein said electrolyte distribution structure has a plurality of transport channels; each of said transport channels has a first end opening and a second end opening; one of said first end openings communicates with said chamber; and said second end openings communicate with said draining members of said electrochemical processing units, respectively.

4. The grind machining apparatus as claimed in claim 3, wherein the shape of said chamber of said flow guiding member is a curved-shape; said chamber is located on a spin path of said first end openings of said transport channels in said electrolyte distribution structure; and the area of said chamber is greater than the area of said first end opening of each said transport channel.

5. The grind machining apparatus as claimed in claim 2, further comprising a spin mechanism including a bearing, a limiter, and an axle positioning member; said electrolyte distribution structure passing through said axle of said grinding wheel; said bearing passing through said electrolyte distribution structure; said limiter surrounding and fixed to said electrolyte distribution structure and located on one side of said bearing; said axle positioning member put around said electrolyte distribution structure and fixed to said flow guiding member; and said bearing and said limiter located between said axle positioning member and said flow guiding member.

6. The grind machining apparatus as claimed in claim 2, wherein said electrolyte transport module further includes an input structure disposed at said flow guiding member and communicating with said chamber.

7. The grind machining apparatus as claimed in claim 1, further comprising a cover covering a part of the surface of said grinding wheel.

8. A grind machining apparatus, comprising:
a grinding wheel, having a grinding surface; and
an electrochemical processing module, comprising a plurality of electrochemical processing units, disposed at said grinding wheel, and having a processing surface facing the direction away from an axle of said grinding wheel and located lower than said grinding surface;
wherein each of said electrochemical processing units includes a processing electrode and a draining member; said processing electrode is disposed at said draining member; and said processing surface of said processing electrode faces the direction away from said axle of said grinding wheel.

9. The grind machining apparatus as claimed in claim 8, further comprising an electrolyte transport module including a flow guiding member and an electrolyte distribution structure; said flow guiding member having a chamber; said flow guiding member disposed at said electrolyte distribution structure; said chamber communicating with said electrolyte distribution structure; and said electrolyte distribution structure disposed in said grinding wheel and communicating with said draining members of said electrochemical processing units.

10. The grind machining apparatus as claimed in claim 9, wherein said electrolyte distribution structure has a plurality of transport channels; each of said transport channels has a first end opening and a second end opening; one of said first end openings communicates with said chamber; and said second end openings communicate with said draining members of said electrochemical processing units, respectively.

11. The grind machining apparatus as claimed in claim 10, wherein the shape of said chamber of said flow guiding member is a curved-shape; said chamber is located on a spin path of said first end openings of said transport channels in said electrolyte distribution structure; and the area of said chamber is greater than the area of said first end opening of each said transport channel.

12. The grind machining apparatus as claimed in claim 10, further comprising a spin mechanism including a bearing, a limiter, and an axle positioning member; said electrolyte distribution structure passing through said axle of said grinding wheel; said bearing passing through said electrolyte distribution structure; said limiter surrounding and fixed to said electrolyte distribution structure and located on one side of said bearing; said axle positioning member put around said electrolyte distribution structure and fixed to said flow guiding member; and said bearing and said limiter located between said axle positioning member and said flow guiding member.

13. The grind machining apparatus as claimed in claim 10, wherein said electrolyte transport module further includes an input structure disposed at said flow guiding member and communicating with said chamber.

14. The grind machining apparatus as claimed in claim 8, further comprising a cover covering a part of the surface of said grinding wheel.

\* \* \* \* \*